US011283255B2

(12) United States Patent
Yang

(10) Patent No.: US 11,283,255 B2
(45) Date of Patent: Mar. 22, 2022

(54) LOAD CENTER THAT REDUCES TRIP TIME DURING SHORT CIRCUIT FAULTS

(71) Applicant: Siemens Industry, Inc., Alpharetta, GA (US)

(72) Inventor: Guang Yang, Johns Creek, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 16/986,481

(22) Filed: Aug. 6, 2020

(65) Prior Publication Data

US 2022/0045497 A1    Feb. 10, 2022

(51) Int. Cl.
*H02H 3/16* (2006.01)
*H02H 3/02* (2006.01)
*H01H 9/54* (2006.01)
*H02H 7/22* (2006.01)
*H02H 1/00* (2006.01)

(52) U.S. Cl.
CPC .............. *H02H 3/021* (2013.01); *H01H 9/54* (2013.01); *H02H 3/16* (2013.01); *H02H 7/22* (2013.01); *H02H 1/0061* (2013.01); *H02H 1/0092* (2013.01); *H02H 3/165* (2013.01)

(58) Field of Classification Search
CPC .......... H02H 7/22; H02H 1/00; H02H 1/0092; H02H 1/0061; H02H 3/16; H02H 3/165; H01H 9/54; H01H 89/00; H01H 71/10; H01H 71/12; H01H 71/1081; H01H 71/123

USPC ....................................................... 361/2–13
See application file for complete search history.

(56) References Cited

U.S. PATENT DOCUMENTS

2002/0097542 A1    7/2002  Perichon
2017/0004948 A1*   1/2017  Leyh ...................... H01H 9/548
2019/0103742 A1*   4/2019  Kennedy .................. H02H 7/22

FOREIGN PATENT DOCUMENTS

EP           1833135 A1    9/2007

OTHER PUBLICATIONS

PCT International Search Report and Written Opinion of International Searching Authority dated Oct. 26, 2021 corresponding to PCT International Application No. PCT/US2021/041349 filed Jul. 13, 2021.

* cited by examiner

*Primary Examiner* — Danny Nguyen

(57) ABSTRACT

A load center comprises a common instantaneous tripping unit that works on a principle of solid state switching. The load center further comprises a plurality of branches of branch circuit breakers each of which is coupled to the common instantaneous tripping unit via a corresponding high power connection and a corresponding low power connection such that the common instantaneous tripping unit feeds the plurality of branches at the same time. The common instantaneous tripping unit interrupts a short circuit fault in an interruption time which is significantly reduced thus reducing or eliminating chances for a personal injury during the short circuit fault.

20 Claims, 3 Drawing Sheets

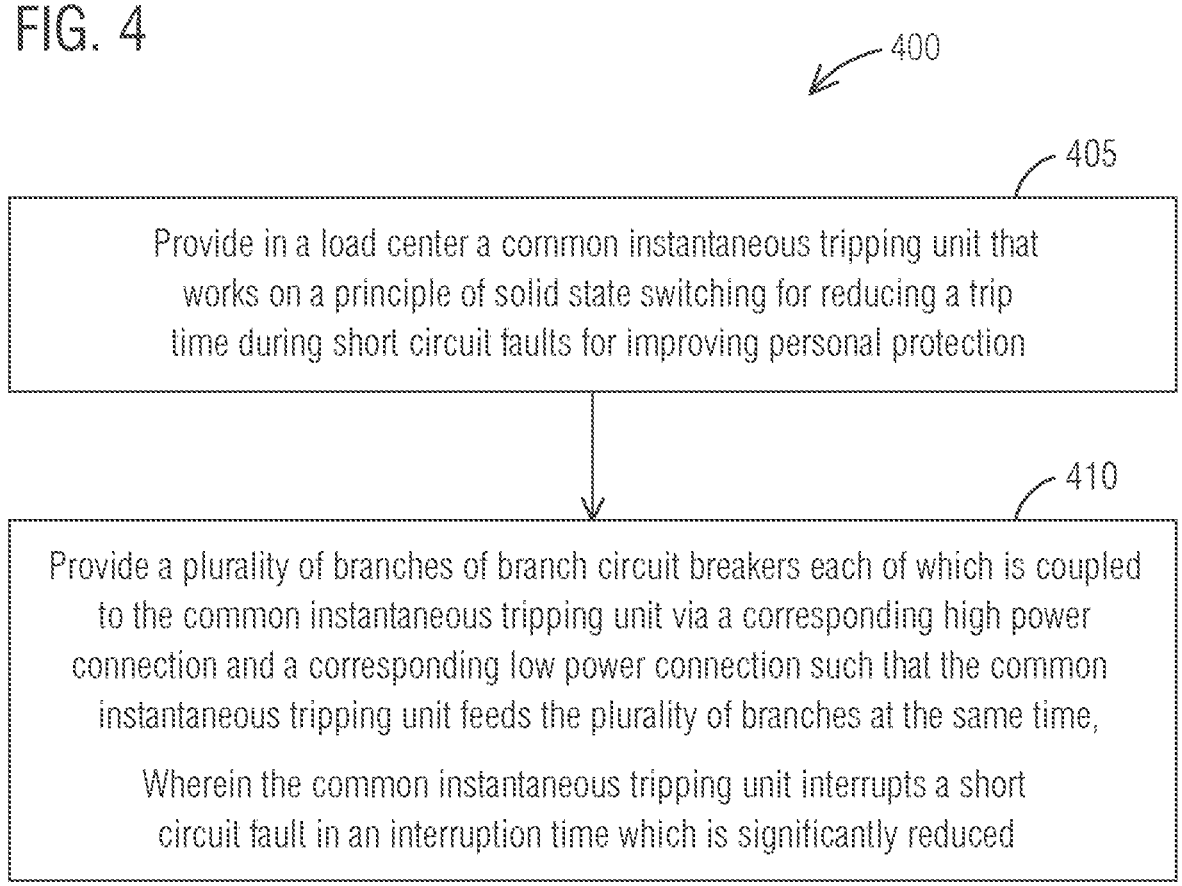

LOAD CENTER THAT REDUCES TRIP TIME DURING SHORT CIRCUIT FAULTS

BACKGROUND

1. Field

Aspects of the present invention generally relate to a load center that reduces trip time during short circuit faults for improving personal protection.

2. Description of the Related Art

Electrical safety in residential area is important. For a long time, circuit breakers are designed and installed into residential areas to protect wirings. Then a group of circuit breakers such as ground fault circuit interrupters (GFCIs) are designed for personal protections underground fault conditions. However, personal protections from other types of electrical faults have not been implemented. For example, a person may mistakenly touch an outlet with fingers or conducting objects and the situation creates a short circuit fault. With existing circuit breaker designs, the current can last for 16 ms, which may cause personal injury.

Therefore, there is a need for a better way to protect from short circuit faults for improving personal protection.

SUMMARY

Briefly described, aspects of the present invention relate to a load center configuration that significantly reduces a trip time and hence reduces or eliminates the chance for personal injury during a short circuit fault. A load center contains one common instantaneous tripping unit which feeds multiple branches at the same time. The instantaneous tripping unit works on the principle of solid state switching. For example, the instantaneous tripping unit should contain power MOSFETs, whose drain and source are used for current conducting and a gate is used for switching current ON and OFF. Solid state devices have the significant advantage on the speed to interrupt current over traditional breakers. A traditional circuit breaker interrupts short circuit fault within time in the order of 10 ms while a solid-state device interrupts short circuit fault in several microseconds. Such reduction in interruption time drastically reduces or eliminates the chances for personal injury during such faults.

In accordance with one illustrative embodiment of the present invention, a load center comprises a common instantaneous tripping unit that works on a principle of solid state switching. The load center further comprises a plurality of branches of branch circuit breakers each of which is coupled to the common instantaneous tripping unit via a corresponding high power connection and a corresponding low power connection such that the common instantaneous tripping unit feeds the plurality of branches at the same time. The common instantaneous tripping unit interrupts a short circuit fault in an interruption time which is significantly reduced.

In accordance with one illustrative embodiment of the present invention, a method is provided for reducing a trip time during short circuit faults for improving personal protection. The method comprises a step of providing in a load center a common instantaneous tripping unit that works on a principle of solid state switching. The method further comprises a step of providing a plurality of branches of branch circuit breakers each of which is coupled to the common instantaneous tripping unit via a corresponding high power connection and a corresponding low power connection such that the common instantaneous tripping unit feeds the plurality of branches at the same time. The common instantaneous tripping unit interrupts a short circuit fault in an interruption time which is significantly reduced.

BRIEF DESCRIPTION OF THE DRAWINGS

FIG. 4 illustrates a schematic view of a flow chart of a method for faster tripping in response to short circuit faults in accordance with an exemplary embodiment of the present invention.

DETAILED DESCRIPTION

Figure 1:
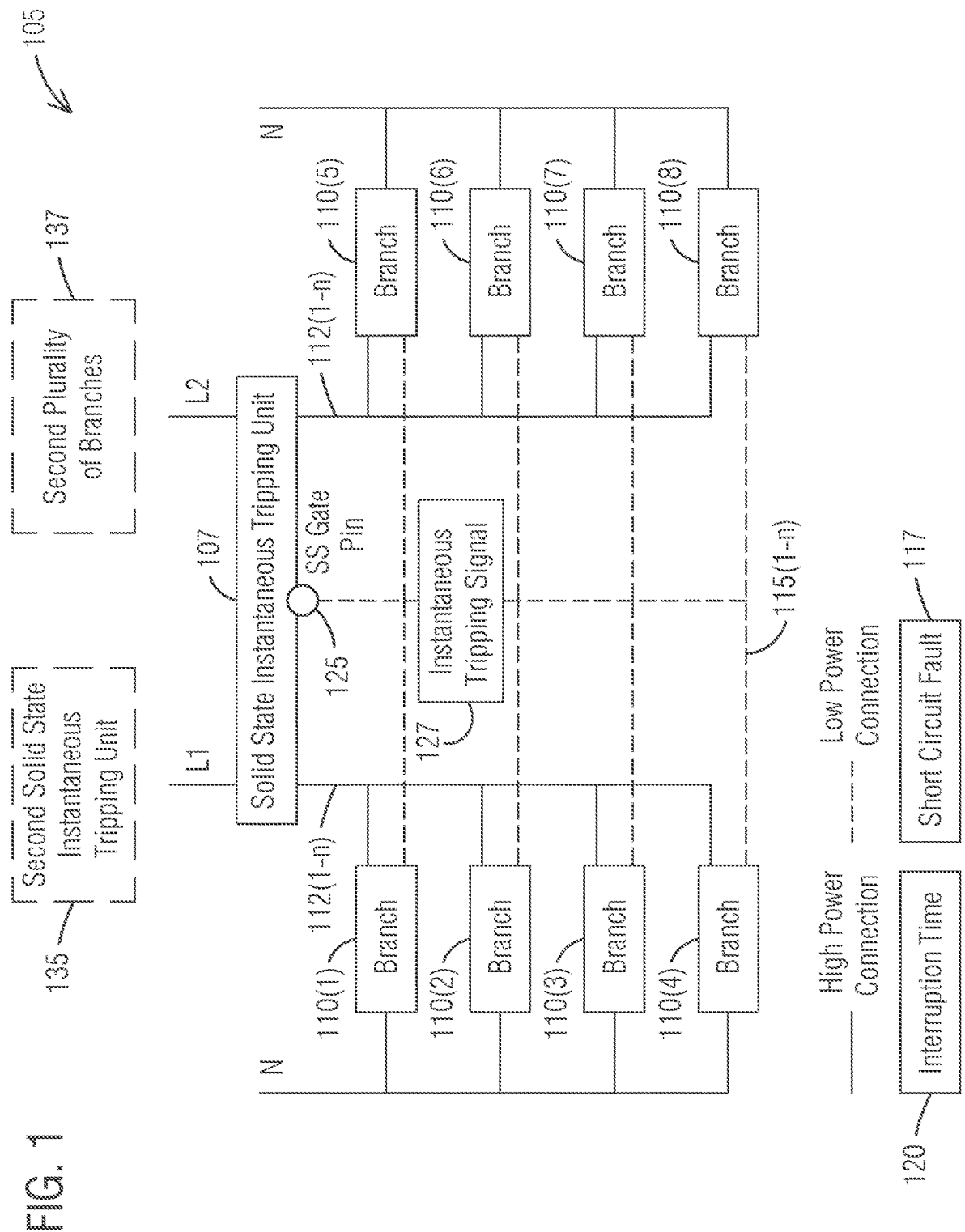
FIG. 1 illustrates a block diagram of a load center that reduces trip time during short circuit faults for improving personal protection in accordance with an exemplary embodiment of the present invention.

To facilitate an understanding of embodiments, principles, and features of the present invention, they are explained hereinafter with reference to implementation in illustrative embodiments. In particular, they are described in the context of a load center that contains one common instantaneous tripping unit which feeds multiple branches at the same time. The branch currents are fed by the common instantaneous tripping unit and through each branch circuit breaker to each branch. Branch circuit breakers also have a low power connection to a gate of the instantaneous tripping unit which allows each of the branch circuit breakers to signal the instantaneous tripping unit to trip. Each branch circuit breaker protects faults other than short circuit on their own. For example, during overload, arc fault or ground fault, branch circuit breakers open the corresponding branch circuit. During short circuit fault, once the branch circuit breakers detect such a fault, a tripping signal is sent to the gate of the instantaneous tripping unit through the low power connection, and the instantaneous tripping unit trips and turns OFF power for all the branches it feeds. With this configuration, any short circuit faults in any branches can be interrupted within several microseconds. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the load center according to the present disclosure are described below with reference to FIGS. 1-4 herein. Like reference numerals used in the drawings identify similar or identical elements throughout the several views. The drawings are not necessarily drawn to scale.

Consistent with one embodiment of the present invention, FIG. 1 represents a block diagram of a load center 105 that reduces trip time during short circuit faults for improving personal protection in accordance with an exemplary embodiment of the present invention. The load center 105 is used in residential and light commercial applications to distribute electricity supplied by a utility company throughout a home or a building to feed all branch circuits. Each branch circuit is protected by the circuit breaker housed in the load center 105. In the event of a short circuit or an overload on a branch circuit, the circuit breaker will cut the power before any potential property damage or personal injury can occur. The load center 105 provides similar functionality in a power distribution system as compared to a panelboard. In North America, the electrical industry refers to smaller, lower cost panelboards sold primarily in residential applications as load centers. The load center 105 only uses plug-on circuit breakers.

The load center 105 helps to provide safety to a homeowner, and maintenance personnel by housing all the branch circuits in one enclosure, helping to prevent coming in contact with energized electrical parts. The load center 105 uses plug-on circuit breakers to reliably distribute the electricity to circuits throughout a home or a small building. Plug-on, refers to how a circuit breaker connects to a bus bar of the load center 105. The load center 105 can provide safety from ground and arc faults by using specialty, or electronic circuit breakers.

The load center 105 has a wide range of applications from single family homes to original equipment (OEM) products. They range from 40-600 amps, and 2-120 circuits. The load center 105 provides power distribution in light commercial buildings such as strip malls, office buildings, and warehouses. The load center 105 can also be used to upgrade and replace older distribution equipment. The load center 105 can be equipped with a main breaker or main lug only (MLO) design. In a load center with a main breaker design, the incoming supply cables are connected directly to the main circuit breaker. The main circuit breaker provides a level of overcurrent protection for all branch circuits, as well as a single disconnect means for all loads being fed by the load center 105.

The load center 105 comprises a common instantaneous tripping unit 107 that works on a principle of solid state switching. The load center 105 further comprises a plurality of branches 110(1-8) of branch circuit breakers each of which is coupled to the common instantaneous tripping unit 107 via a corresponding high power connection 112(1-$n$) and a corresponding low power connection 115(1-$n$) such that the common instantaneous tripping unit 107 feeds the plurality of branches 110(1-8) at the same time. Four branches 110 each are provided for each phase (L1 and L2) across a neutral (N).

The common instantaneous tripping unit 107 interrupts a short circuit fault 117 in an interruption time 120 which is significantly reduced thus reducing or eliminating chances for a personal injury during the short circuit fault 117. For example, the common instantaneous tripping unit 107 interrupts the short circuit fault 117 in the interruption time 120 which is in a range of microseconds such as less than 100 microseconds.

The load center 105 contains one common instantaneous tripping unit 107 which feeds the multiple branches 110(1-8) at the same time. The common instantaneous tripping unit 107 works on the principle of solid state switching. For example, the common instantaneous tripping unit 107 may contain power MOSFETs, whose drain and source are used for current conducting and a gate is used for switching current ON and OFF. Solid state devices have the significant advantage on the speed to interrupt current over traditional breakers. A traditional circuit breaker interrupts short circuit fault within time in the order of 10 ms while a solid-state device interrupts short circuit fault in several microseconds.

Such reduction in interruption time drastically reduces or eliminates the chances for personal injury during such faults.

The branch currents are fed by the common instantaneous tripping unit 107 and through each branch circuit breaker to each branch 110. That is, the branch currents are fed through each branch circuit breaker of the branch circuit breakers to each branch of the plurality of branches 110(1-8). Each branch circuit breaker of the branch circuit breakers protects faults other than a short circuit fault on their own such as during an overload, an arc fault or a ground fault the branch circuit breakers open a corresponding branch circuit. During the short circuit fault 117 once the branch circuit breakers detect the short circuit fault 117, the tripping signal 127 is sent to a gate 125 of the common instantaneous tripping unit 107 through the low power connection 115 and the common instantaneous tripping unit 107 trips and turns OFF power for all branches 110 it feeds.

Branch circuit breakers also have the low power connection 115(1-$n$) to the gate 125 of the common instantaneous tripping unit 107 which allows each of the branch circuit breakers to signal the common instantaneous tripping unit 107 to trip. Each branch circuit breaker protects faults other than short circuit on their own. For example, during overload, arc fault or ground fault, branch circuit breakers open the corresponding branch circuit. During a short circuit fault, once the branch circuit breakers detect such a fault, a tripping signal 127 is sent to the gate 125 of the common instantaneous tripping unit 107 through the low power connection 115(1-$n$), and the common instantaneous tripping unit 107 trips and turns OFF power for all the branches 110 it feeds. With this configuration, any short circuit faults in any branches 110 can be interrupted within several microseconds.

Different configurations can be used for different purposes. If the common instantaneous tripping unit 107 is not needed for certain branches 110, the low power connections 115(1-$n$) to the gate 125 can be disabled. The branch circuit breaker can still trip on short circuit through traditional circuit breaker mechanism. This option may be beneficial for branches 110 that feed equipment and less likely to be touched by people. Also, multiple instantaneous tripping units can be used instead of one. In such a case, each feeds several branches 110 and only turns OFF power for those branches 110 instead of a whole panel.

Another advantage of using solid state devices as the common instantaneous tripping unit 107 is the flexibility of resetting. For example, once tripped, the common instantaneous tripping unit 107 can monitor the status of the faulty branch(es) 110. If the faulty branch 110 clears the short circuit tripping signal 127 through the low power connection 115(1-$n$), the common instantaneous tripping unit 107 can reset itself. In this case, a decision-making unit (normally a low voltage circuit board with processors) of each branch 110 should be powered directly from the system power and not affected by the common instantaneous tripping unit 107.

An instantaneous tripping happens when the common instantaneous tripping unit 107 receives the instantaneous tripping signal 127 from a branch of the plurality of branches 110(1-8) such that the instantaneous tripping signal 127 is provided in response to the short circuit fault 117. Once tripped, the common instantaneous tripping unit 107 monitors a status of one or more faulty branches 110 such that if a faulty branch clears the short circuit tripping signal 127 through the low power connection 115, the common instantaneous tripping unit 107 can reset itself.

In one embodiment, the common instantaneous tripping unit 107 contains one or more solid state switching components such as power metal-oxide-semiconductor field-effect transistors (MOSFETs) each of which having a source, a drain and a gate such that the drain and the source are used for current conducting and the gate is used for switching current ON and OFF. In one embodiment, a second common instantaneous tripping unit 135 that feeds a second plurality of branches 137 and only turns OFF power for the second plurality of branches 137 instead of a whole panel.

Figure 2:
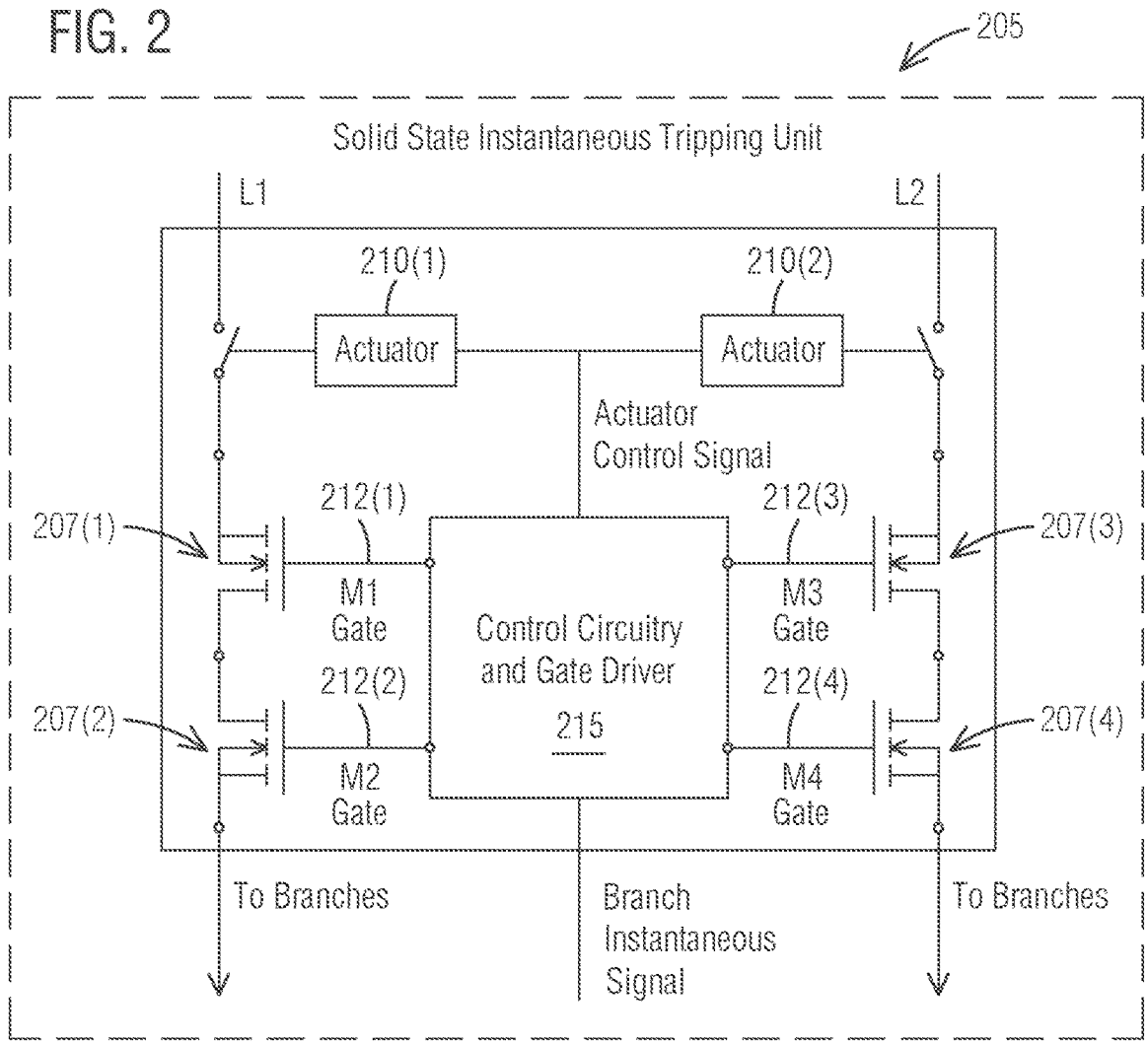
FIG. 2 illustrates hardware components of a solid state common instantaneous tripping unit in accordance with an exemplary embodiment of the present invention.

Referring to FIG. 2, it illustrates hardware components of a solid state common instantaneous tripping unit 205 in accordance with an exemplary embodiment of the present invention. The solid state common instantaneous tripping unit 205 performs instantaneous tripping when it receives an instantaneous tripping signal from a branch. For the solid state instantaneous tripping unit 205, FIG. 2 shows a back-to-back configuration of MOSFETs (M1-M4) 207(1-4) for each phase (L1 and L2). Each phase also has a mechanical air gap, which is driven by an actuator 210(1-2). Gates 212(1-4) and the actuators 210(1-2) are controlled by a control circuitry and gate driver 215.

Figure 3:
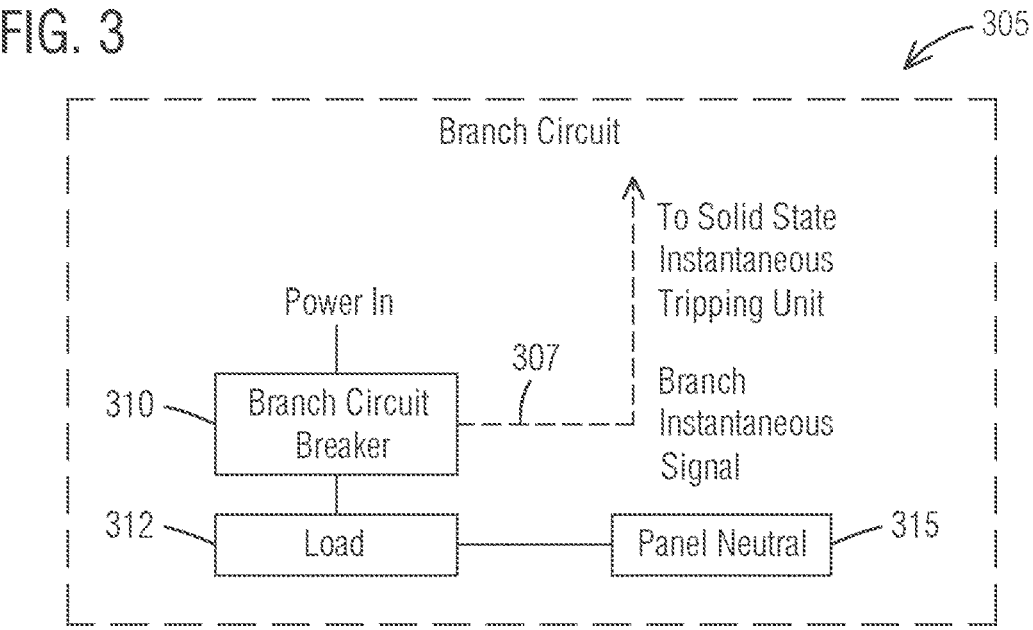
FIG. 3 illustrates an example of a branch in accordance with an exemplary embodiment of the present invention.

Turning now to FIG. 3, it illustrates an example of a branch circuit 305 in accordance with an exemplary embodiment of the present invention. The branch circuit 305 has overload, arc fault (AF), ground fault (GF) protection and sends a branch instantaneous signal 307 to a solid-state (SS) Main. The branch circuit 305 receives "power in" at a branch circuit breaker 310 which is connected to a load 312 which is further connected to a panel neutral 315. The branch instantaneous signal 307 is provided by the branch circuit breaker 310 and sent to the solid state common instantaneous tripping unit 205 (see FIG. 2).

FIG. 4 illustrates a schematic view of a flow chart of a method 400 for faster tripping in response to short circuit faults in accordance with an exemplary embodiment of the present invention. Reference is made to the elements and features described in FIGS. 1-3. It should be appreciated that some steps are not required to be performed in any particular order, and that some steps are optional.

The method 400 comprises a step 405 of providing in a load center a common instantaneous tripping unit that works on a principle of solid state switching. The method 400 further comprises a step 410 of providing a plurality of branches of branch circuit breakers each of which is coupled to the common instantaneous tripping unit via a corresponding high power connection and a corresponding low power connection such that the common instantaneous tripping unit feeds the plurality of branches at the same time. The common instantaneous tripping unit interrupts a short circuit fault in an interruption time which is significantly reduced thus reducing or eliminating chances for a personal injury during the short circuit fault.

While a solid-state switching based on a drain, a source, and a gate is described here a range of one or more other types of solid-state switching components or other forms of solid state are also contemplated by the present invention. For example, other types of solid-state switching components may be implemented based on one or more features presented above without deviating from the spirit of the present invention.

The techniques described herein can be particularly useful for particular configuration of a load center for ground fault circuit interrupters (GFCIs). While particular embodiments are described in terms of specific configuration and specific circuit breakers, the techniques described herein are not limited to such a limited configuration and circuit breakers but can also be used with other configurations and circuit breakers.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A load center comprising:
a common instantaneous tripping unit that works on a principle of solid state switching; and
a plurality of branches of branch circuit breakers each of which is coupled to the common instantaneous tripping unit via a corresponding high power connection and a corresponding low power connection such that the common instantaneous tripping unit feeds the plurality of branches at the same time,
wherein the common instantaneous tripping unit interrupts a short circuit fault in an interruption time which is significantly reduced, and
wherein the common instantaneous tripping unit contains one or more solid state switching components including power metal-oxide-semiconductor field-effect transistors (MOSFETs) each of which having a source, a drain and a gate such that the drain and the source are used for current conducting and the gate is used for switching current ON and OFF.

2. The load center of claim 1, wherein the common instantaneous tripping unit interrupts the short circuit fault in the interruption time which is in a range of microseconds such as less than 100 microseconds.

3. The load center of claim 1, wherein an instantaneous tripping happens when the common instantaneous tripping unit receives an instantaneous tripping signal from a branch of the plurality of branches such that the instantaneous tripping signal is provided in response to the short circuit fault.

4. The load center of claim 1, wherein branch currents are fed by the common instantaneous tripping unit and through each branch circuit breaker of the branch circuit breakers to each branch of the plurality of branches.

5. The load center of claim 1, wherein the branch circuit breakers have a low power connection to a gate of the common instantaneous tripping unit which allows each branch circuit breaker to signal the common instantaneous tripping unit to trip.

6. The load center of claim 1, wherein each branch circuit breaker of the branch circuit breakers protects faults other than a short circuit fault on their own such as during an overload, an arc fault or a ground fault the branch circuit breakers open a corresponding branch circuit.

7. The load center of claim 1, wherein during a short circuit fault once the branch circuit breakers detect the short circuit fault, a tripping signal is sent to a gate of the common instantaneous tripping unit through the low power connection and the common instantaneous tripping unit trips and turns OFF power for all branches it feeds.

8. The load center of claim 1, further comprising:
a second common instantaneous tripping unit that feeds a second plurality of branches and only turns OFF power for the second plurality of branches instead of a whole panel.

9. The load center of claim 1, wherein once tripped, the common instantaneous tripping unit monitors a status of one or more faulty branches such that if a faulty branch clears a short circuit tripping signal through the low power connection, the common instantaneous tripping unit can reset itself.

10. A load center comprising:
a common instantaneous tripping unit that works on a principle of solid state switching; and
a plurality of branches of branch circuit breakers each of which is coupled to the common instantaneous tripping unit via a corresponding high power connection and a corresponding low power connection such that the common instantaneous tripping unit feeds the plurality of branches at the same time,
wherein the common instantaneous tripping unit interrupts a short circuit fault in an interruption time which is significantly reduced, and
wherein the branch circuit breakers have a low power connection to a gate of the common instantaneous tripping unit which allows each branch circuit breaker to signal the common instantaneous tripping unit to trip.

11. The load center of claim 10, wherein the common instantaneous tripping unit interrupts the short circuit fault in the interruption time which is in a range of microseconds such as less than 100 microseconds.

12. The load center of claim 10, wherein an instantaneous tripping happens when the common instantaneous tripping unit receives an instantaneous tripping signal from a branch of the plurality of branches such that the instantaneous tripping signal is provided in response to the short circuit fault.

13. The load center of claim 10, wherein branch currents are fed by the common instantaneous tripping unit and through each branch circuit breaker of the branch circuit breakers to each branch of the plurality of branches.

14. A load center comprising:
    a common instantaneous tripping unit that works on a principle of solid state switching; and
    a plurality of branches of branch circuit breakers each of which is coupled to the common instantaneous tripping unit via a corresponding high power connection and a corresponding low power connection such that the common instantaneous tripping unit feeds the plurality of branches at the same time,
    wherein the common instantaneous tripping unit interrupts a short circuit fault in an interruption time which is significantly reduced, and
    wherein during the short circuit fault once the branch circuit breakers detect the short circuit fault, a tripping signal is sent to a gate of the common instantaneous tripping unit through the low power connection and the common instantaneous tripping unit trips and turns OFF power for all branches it feeds.

15. The load center of claim 14, wherein the common instantaneous tripping unit interrupts the short circuit fault in the interruption time which is in a range of microseconds such as less than 100 microseconds.

16. The load center of claim 14, wherein an instantaneous tripping happens when the common instantaneous tripping unit receives an instantaneous tripping signal from a branch of the plurality of branches such that the instantaneous tripping signal is provided in response to the short circuit fault.

17. The load center of claim 14, wherein branch currents are fed by the common instantaneous tripping unit and through each branch circuit breaker of the branch circuit breakers to each branch of the plurality of branches.

18. The load center of claim 14, wherein each branch circuit breaker of the branch circuit breakers protects faults other than the short circuit fault on their own such as during an overload, an arc fault or a ground fault the branch circuit breakers open a corresponding branch circuit.

19. The load center of claim 14, further comprising:
    a second common instantaneous tripping unit that feeds a second plurality of branches and only turns OFF power for the second plurality of branches instead of a whole panel.

20. The load center of claim 14, wherein once tripped, the common instantaneous tripping unit monitors a status of one or more faulty branches such that if a faulty branch clears a short circuit tripping signal through the low power connection, the common instantaneous tripping unit can reset itself.

* * * * *